(12) United States Patent
Oren et al.

(10) Patent No.: US 6,860,786 B2
(45) Date of Patent: Mar. 1, 2005

(54) PLAY ARCH ATTACHABLE TO STROLLER CHAIR

(75) Inventors: Shoshana Oren, Herzlia (IL); Roni Golos, Ono (IL); Zafrira Weisman, Ono (IL)

(73) Assignee: Tiny Love Ltd., Tel-Aviv (IL)

( * ) Notice: Subject to any disclaimer, the term of this patent is extended or adjusted under 35 U.S.C. 154(b) by 0 days.

(21) Appl. No.: 10/333,129

(22) PCT Filed: May 31, 2001

(86) PCT No.: PCT/IL01/00503
§ 371 (c)(1),
(2), (4) Date: Mar. 31, 2003

(87) PCT Pub. No.: WO02/05917
PCT Pub. Date: Jan. 24, 2002

(65) Prior Publication Data
US 2004/0077269 A1 Apr. 22, 2004

(30) Foreign Application Priority Data
Jul. 18, 2000 (IL) .............................................. 137344

(51) Int. Cl.[7] ............................................ A63H 33/00
(52) U.S. Cl. ................................................... 446/227
(58) Field of Search ........................... 446/227; 211/118

(56) References Cited
U.S. PATENT DOCUMENTS

| 355,663 | A | | 1/1887 | Price |
| 1,265,682 | A | | 5/1918 | Larsen |
| 2,402,861 | A | | 6/1946 | Winnick |
| 3,978,610 | A | | 9/1976 | Stubbmann |
| 4,722,713 | A | * | 2/1988 | Williams et al. ............ 446/227 |
| 6,016,926 | A | | 1/2000 | Smith, II et al. |
| 6,068,285 | A | | 5/2000 | Jackson et al. |
| 6,475,057 | B1 | * | 11/2002 | Norman ...................... 446/227 |
| 6,640,985 | B1 | * | 11/2003 | Cheng ........................ 211/118 |

FOREIGN PATENT DOCUMENTS

| FR | 436 419 A | 3/1912 |
| FR | 2 720 291 A | 12/1995 |
| GB | 670 881 A | 4/1952 |
| GB | 2 279 265 A | 4/1995 |

* cited by examiner

Primary Examiner—A. L. Wellington
Assistant Examiner—Ali Abdelwahed
(74) Attorney, Agent, or Firm—Birch, Stewart, Kolasch & Birch, LLP

(57) ABSTRACT

A play arch, which may be attached to the chair portion of a stroller, includes an elongated flat strip having a securing element at each end thereof. The securing elements may be attached to the stroller. Because the length of the strip exceeds the width of the stroller chair, in use the strip assumes a shape of an arch. Hangers are provided, which support dangling play pieces which may be manipulated by a child in the stroller.

12 Claims, 2 Drawing Sheets

PLAY ARCH ATTACHABLE TO STROLLER CHAIR

This application is the national phase under 35 U.S.C. § 371 of PCT International Application No. PCT/IL01/00503 which has an International filing date of May 31, 2001, which designated the United States of America.

FIELD OF THE INVENTION

This invention relates generally to an attachment for a stroller from which play pieces are suspended to amuse a child laying or sitting in the stroller chair, and more particularly to an attachment in the form of an arch adapted to clamp onto the sides of the chair. The attachment is suitable for use also with seats, cribs, etc. which for the sake of convenience are hereinafter in the specification and claims, collectively referred to as "strollers".

BACKGROUND OF THE INVENTION

A stroller is a collapsible carriage designed to function as a wheeled chair for seating a small child (which may also lay), the stroller being pushable. An infant seated or laying in a stroller may be compelled to stay therein for a prolonged period, such as when the stroller is being propelled by the infant's parent who is on a shopping expedition.

A child sitting or laying in a stroller for more than a few minutes cannot be expected to sit quietly, for the child has a need to play. By nature, a child has an urge to play, for play is essential to the child's development. It is through play that a child acquires elementary skills.

To gratify a child's need to play in a stroller, it is known to provide for this purpose a crossbar attachment, to which some play pieces are attached which are accessible to the child seated in the stroller. Thus as the stroller is being pushed, the child may then manipulate or otherwise play with the play pieces. But the child cannot throw a play piece out of the stroller, for it is linked to the crossbar.

A stroller attachment cannot be permanently installed, for the attachment is intended for occasional use and therefore must be attachable to and detachable from the stroller, also for attaching to another child accommodating device, e.g. crib, etc. There are known strollers provided with such attachments, e.g. those described in U.S. Pat. No. 3,978,610, U.S. Pat. No. 1,265,682 or U.S. Pat. No. 2,402,861. One drawback of existing attachments is that they are difficult to couple and decouple from the stroller. Another drawback is that the attachment does not provide a stable support for the pieces supported therefrom. And with existing attachments it is not possible to easily replace the play pieces linked thereto with other play pieces. Even more so, when the stroller is collapsed, it is necessary to remove the attachment and then reinstall it. To maintain a child's interest in a stroller attachment, it is desirable when the child has become overly familiar with the original play pieces, to replace them with play pieces having a different character and thereby renew the child's interest in the toy.

SUMMARY OF THE INVENTION

In view of the foregoing, the main object of the invention is to provide a stable attachment for the chair of a stroller from which play pieces are suspended or otherwise articulated thereto, to amuse a small child seated in the chair, or other child accommodating device, the attachment being readily coupled or decoupled from the sides of the chair so that it is not difficult to install on or detach from the chair.

A significant feature of the invention is that the play pieces are hooked to the attachment and may therefore readily be replaced.

More particularly, an object of this invention is to provide an attachment of the above type in the form of a play arch whose ends are clampable onto the sides of the stroller chair whereby the arch overlies the child seated therein.

Yet another object of this invention is to provide a play arch for a stroller that can be installed on strollers having chairs of different widths. The unique design of the play article is such that the stroller may be folded/collapsed without having to uninstall the arch.

Also an object of this invention is to provide a play arch constituted by a molded elongated strip of resilient plastic material, whereby the arch can be mass-produced at relatively low cost.

Briefly stated, these objects are accomplished in a play arch attachable to the chair of a stroller to be occupied by a small child. Dangling from the arch are play pieces which are animated when the stroller is occupied by a child. The arch is formed by an elongated strip of resilient plastic material whose opposite sides are sinuously contoured to define a series of lobes, the opposing lobes of the strip being curved inwardly to create non-bendable segments interconnected by bendable living hinges. The length of the strip is greater than the width of the chair, whereby when the ends of the strip are clamped to the sides of the chair, the strip is then bowed to erect an arch.

According to one specific embodiment, the arch is articulated to the chair by suitable clamps which allow the arch to be tilted back and forth or fixed at an intermediate position by suitable fixing mechanism.

BRIEF DESCRIPTION OF THE DRAWINGS

For a better understanding of the invention as well as of the objects and features thereof, reference is made to the annexed drawing wherein.

DETAILED DESCRIPTION OF INVENTION

Figure 1:
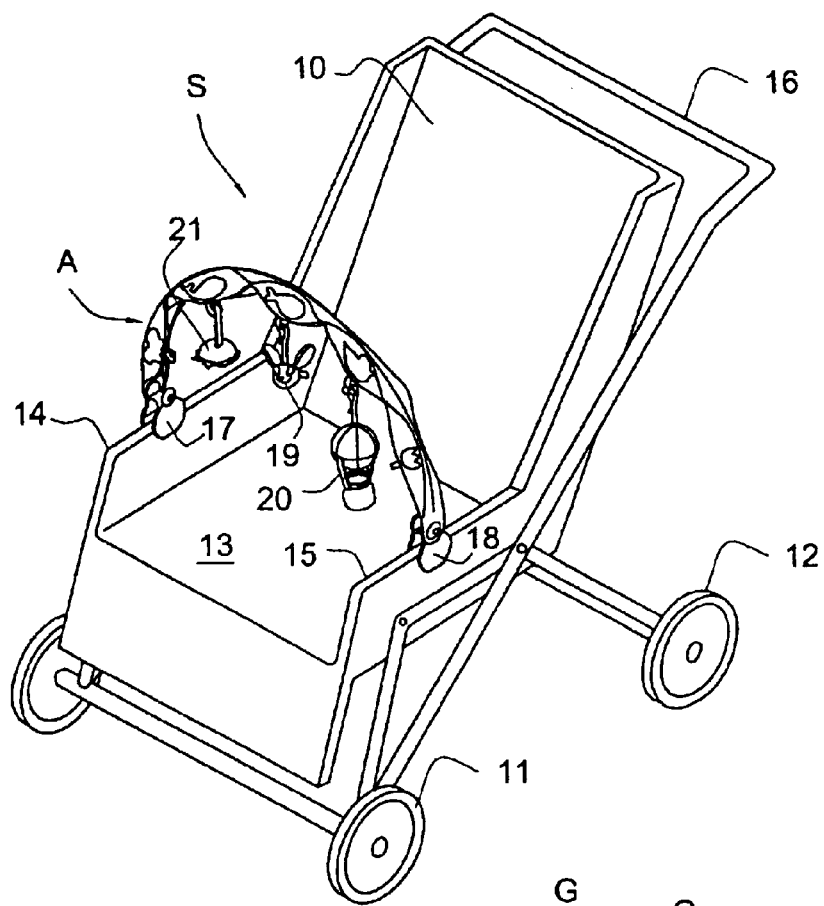
FIG. 1 is a perspective view of a conventional stroller on whose chair is installed a play arch in accordance with the invention.
Figure 2:
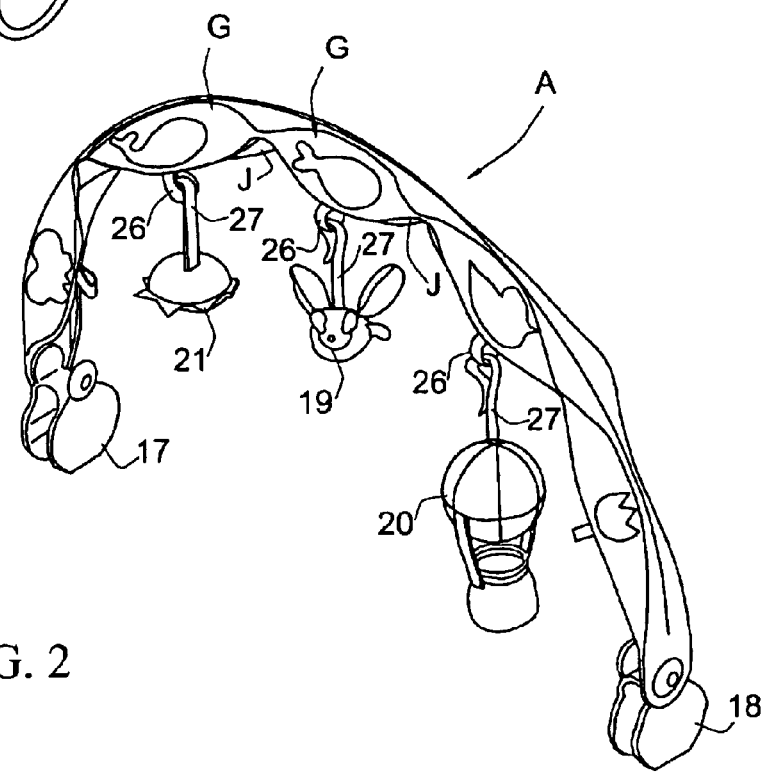
FIG. 2 separately illustrates the play arch with toy elements suspended therefrom.

Referring now to FIGS. 1 and 2, shown therein is a play arch in accordance with the invention, generally designated by letter A. Arch A is installed on the chair of a stroller, generally identified by letter S.

Stroller S includes a chair 10 mounted over a pair of front wheels 11 and a pair of rear wheels 12. Chair 10 is provided with a seat 13 banked by vertical sides 14 and 15. The stroller is pushed by means of a handlebar 16. Stroller S is schematically illustrated and represents any commercially available stroller whose chair has side arms or vertical walls onto which it is possible to clamp an attachment.

Preferably, but not necessary, the arch may be tilted with respect to the clamps 17 and 18, so as to acquire a desired angle about an axis extending between the two ends of the arch. In this way, the arch may be set to be nearer or further from the child.

Attached to the respective ends of arch A are finger-actuated, spring-biased clamps 17 and 18 whose jaws are normally closed. It is a simple matter to couple or decouple arch A from sides 14 and 15 of the chair, for an operator has only with his finger to squeeze the actuator tabs of the clamp jaws to dilate the jaws so that they can clamp onto a side of the stroller chair.

Dangling from arch A are three different play pieces 19,20 and 21. Because these dangling pieces are free to swing, when the stroller is pushed or when the child fiddles with them, the resultant agitation of the pieces acts to animate them. Thus piece 19 is in the shape of a fanciful flying bug, and when animated, appears to be flying. Piece 20 resembles a flying balloon from which is suspended a passenger bucket. When animated, the piece appears to be in flight, as does piece 21 which resembles a flying saucer. In practice, the arch may be provided with more than three play pieces. Obviously, and as known per se, a large variety of shapes and colors are useful in stimulating the child and attracting it.

Figure 3A:
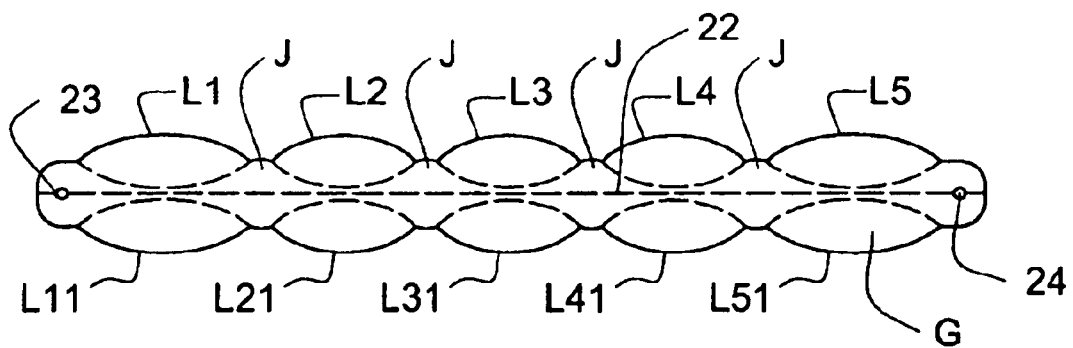
FIG. 3A is a plan view of the elongated plastic strip from which the arch is formed.
Figure 3B:
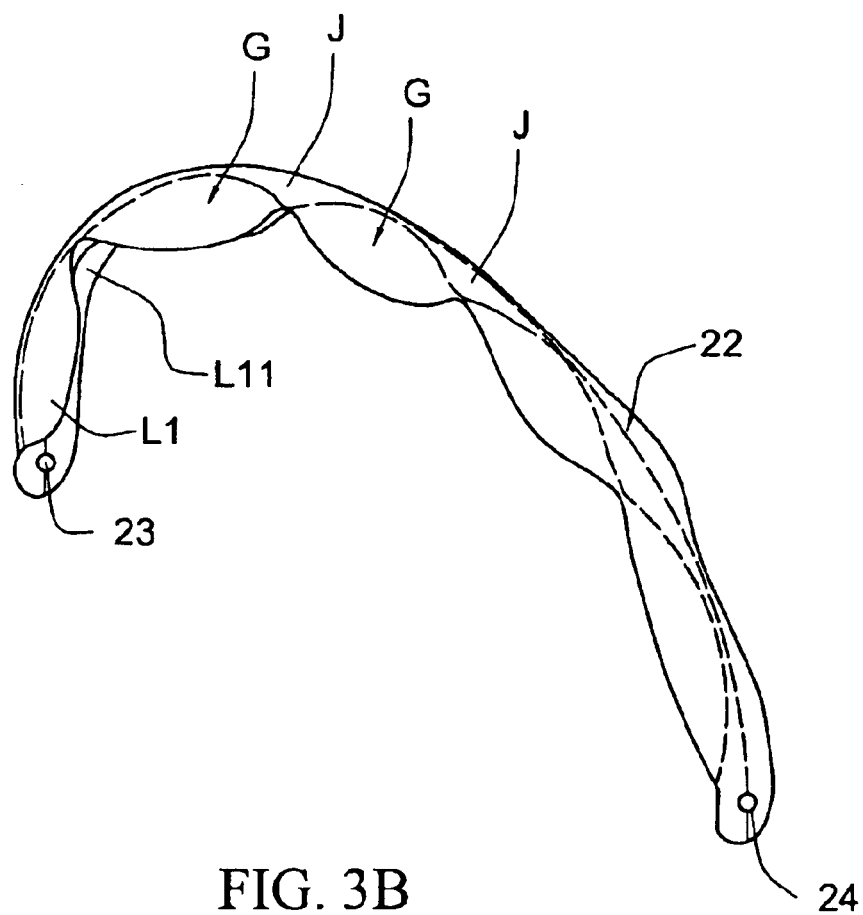
FIG. 3B shows the strip in a bowed state to erect the play arch.

Arch A, as illustrated in FIGS. 3A and 3B is formed by an elongated strip 22 molded of resilient, synthetic plastic material such as PVC, polypropylene or polyethylene. By one particular example, the elongate strip 22 is cut out from a sheet or board of polypropylene. At either end of this strip are holes 23 and 24 into which are insertable bolts to secure clamps 17 and 18 thereto.

The opposite long sides of strip 22 are sinuously contoured to define on each side a series of lobes. Lobes L1, L2, L3, L4 and L5 are formed on one side and like lobes L11, L21,L31,L41 and L51 are formed on the opposite side of the strip.

The series of lobes on opposite sides of the elongated strip are curved inwardly to form non-bendable segments G. Though these segments are formed of flexible plastic material, the curved lobes of the segment create a non-bendable beam that is resistant to bending. The series of non-bendable segments G along the strip are interconnected by flexible junctions J which function as living hinges. Internal fold lines are formed on the strip 22, marked by dashed lines.

The length of elongated strip 22 exceeds the distance between the sides 14 and 15 of the stroller chair to which the strip is to be clamped. Hence when the strip is clamped to the sides of the chair, it is then bowed to assume the curvature of an arch whose hinged together, non-bendable segments follow this curvature. When the strip is arched, the segments fold along the fold lines.

Not all strollers have chairs of the same width. Hence the length of the elongated strip must be great enough to erect a suitable arch with strollers having chairs which differ somewhat in width. Obviously the greater the width of the stroller chair, the smaller the radius of the resultant arch, per a given length.

The structure of an arch is such that it is highly resistant to load forces imposed thereon. A play arch in accordance with the invention is created by interhinged non-bendable plastic segments which are functionally equivalent to the solid elements of a conventional arch. Hence the play arch is stable, for it is resistant to load force and will not deform, even if a child grasping a play piece tries to pull it off the arch. On the other hand, the structure provides some flexibility which will reduce the hazard of injury in case the child falls over the arch.

But apart from the structural advantages of a play arch is the fact that it simulates a theatrical stage for the play pieces. In a theater actors appear on a stage having a proscenium arch. A play arch in accordance with the invention, in effect is the arch over a stage on which appear the play pieces dangling from the arch.

As best seen in FIG. 2, anchored on segment G of the arch and extending downwardly therefrom are eyepins 26 onto which play pieces may be hooked. Each play piece is provided with a hook 27 extending upwardly therefrom which is hookable onto an eyepin. When a play piece is so hooked, it then dangles from the arch and is free to swing and sway. Movement of the stroller agitates and therefore animates the play pieces, thereby entertaining the child seated in the stroller. But the child can do more than just observe the play pieces, for he can also strike or manipulate the pieces.

Because the play pieces are hooked onto the play arch, they can readily be replaced to sustain the child's interest therein. Thus the play pieces shown in FIG. 1, which represent various flying objects can be replaced with miniature animals, such as monkeys, lions and cats, while as known per se, may be adjusted by shape and color to the child's age.

While there has been shown a preferred embodiment of the invention, it is to be understood that many changes and modifications may be made therein without departing from the spirit of the invention. For example, not shown, the play arch may be received within a flexible sheath member of a soft and colorful material, such as fabric, which may be removable for washing.

What is claimed is:

1. A play arch attachable to a chair of a stroller, which may be occupied by a small child, the chair having spaced-apart sides, said arch having play pieces dangling therefrom which are manipulatable by the child; said arch comprising:
    an elongated strip of resilient plastic material having a length greater than a distance between the sides of the chair;
    a coupler at either end of the strip to detachably connect the strip to the sides of the chair to cause the strip to assume a curvature of an arch; and
    hangers suspending said play pieces from the arch;
    wherein opposite sides of the strip are sinuously contoured to define a series of lobes, the lobes on opposite sides being curved inwardly to create non-bendable segments which are interconnected by bendable junctions.

2. A play arch as set forth in claim 1 wherein when the strip is attached to the sides of the chair, the length of the strip is such that the segments of the strip are angled to follow the curvature of the arch.

3. A play arch as set forth in claim 1, wherein the strip is received within a flexible sheath.

4. A play arch as set forth in claim 1, wherein the arch is received within a fabric sleeve.

5. A play arch attachable to a chair of a stroller having spaced-apart sides;
    said arch characterized in that it is an elongated strip of rigid though pliable plastic material having a length greater than a distance between the sides of the chair;
    the arch comprising a plurality of non-bendable segments which are interconnected by bendable integral hinges; and
    a coupler fitted at either end of the strip to connect the strip to the sides of the chair to cause the strip to assume a curvature of an arch.

6. A play arch according to claim 5, wherein said arch comprises attachments for connecting play pieces to the arch to dangle therefrom, which play pieces are manipulatable by a child occupying the chair.

7. A play arch according to claim 5, wherein opposite sides of the strip are sinuously contoured to define a series of lobes, the lobes on opposite sides being curved inwardly to create the non-bendable segments.

8. A play arch according to claim 7, wherein when the strip is attached to the sides of the chair, the length of the strip is such that the segments thereof are angled to follow the curvature of the arch.

9. A play arch according to claim 5, wherein the strip is received within a flexible sheath.

10. A play arch according to claim 5, wherein the arch is pivotally articulated to respective sides of the chair whereby the arch can be tilted about an axis extending between respective ends of the arch.

11. A play arch according to claim 5, wherein the arch is folded about a midline extending between ends of the arch; said midline defining a line of symmetry.

12. A play arch attachable to a chair of a stroller having spaced-apart sides;

said arch having a length greater than a distance between the sides of the chair, said arch comprising a coupler fitted at either end thereof for connecting to the sides of the chair, wherein the arch is configured as an elongated strip of rigid though pliable plastic material and said strip is formed with a plurality of non-bendable segments which are interconnected by bendable integral hinges, whereby connecting the strip to the sides of the chair causes the strip to assume a curvature of an arch.

* * * * *